United States Patent
Kaneko et al.

(10) Patent No.: US 9,598,838 B2
(45) Date of Patent: Mar. 21, 2017

(54) HYBRID WORK VEHICLE WITH LOAD DEPENDENT TARGET STATE OF CHARGE

(71) Applicant: HITACHI CONSTRUCTION MACHINERY CO., LTD, Tokyo (JP)

(72) Inventors: Satoru Kaneko, Tokyo (JP); Takashi Ikimi, Tsuchiura (JP); Noritaka Itou, Tsuchiura (JP); Hidekazu Moriki, Tokyo (JP); Ken Takeuchi, Tsuchiura (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 14/440,897

(22) PCT Filed: Nov. 6, 2013

(86) PCT No.: PCT/JP2013/080015
§ 371 (c)(1),
(2) Date: May 6, 2015

(87) PCT Pub. No.: WO2014/073569
PCT Pub. Date: May 15, 2014

(65) Prior Publication Data
US 2015/0267380 A1    Sep. 24, 2015

(30) Foreign Application Priority Data
Nov. 7, 2012   (JP) ................... 2012-245556

(51) Int. Cl.
*B60W 10/04* (2006.01)
*E02F 9/20* (2006.01)
(Continued)

(52) U.S. Cl.
CPC .............. *E02F 9/2091* (2013.01); *B60K 6/46* (2013.01); *B60L 3/0046* (2013.01);
(Continued)

(58) Field of Classification Search
USPC .... 701/22, 101, 469, 70; 903/930, 947, 907; 320/132
See application file for complete search history.

(56) References Cited

U.S. PATENT DOCUMENTS 4,958,127 A * 9/1990 Williams ............. G01R 31/362
320/132
5,635,805 A * 6/1997 Ibaraki ..................... B60K 6/46
180/65.245
(Continued)

FOREIGN PATENT DOCUMENTS

EP    2 308 732 A1   4/2011
JP    10-150701 A    6/1998
(Continued)

*Primary Examiner* — Thomas Tarcza
*Assistant Examiner* — Richard Goldman
(74) *Attorney, Agent, or Firm* — Mattingly & Malur, PC

(57) ABSTRACT

There are provided a work vehicle comprising a motor generator (6) driven by an engine, a hydraulic pump (4) driven by at least either of the motor generator and the engine, a work device (50) driven by hydraulic fluid from the hydraulic pump, a electric traction motor (9) driving wheels (61), an electrical storage device (11) connected to the motor generator and to the electric traction motor and charged electrically on the basis of a target SOC; and a control device (200) varying the target SOC for the electrical storage device (11) on the basis of total demanded power (Pf+Prun) of the hydraulic pump and the electric traction motor.

7 Claims, 7 Drawing Sheets

(51) Int. Cl.

| | | |
|---|---|---|
| *B60K 6/46* | (2007.10) | |
| *B60L 11/14* | (2006.01) | |
| *B60W 10/26* | (2006.01) | |
| *B60W 20/00* | (2016.01) | |
| *E02F 9/22* | (2006.01) | |
| *B60W 10/30* | (2006.01) | |
| *B60L 3/00* | (2006.01) | |
| *B60L 11/00* | (2006.01) | |
| *B60L 11/12* | (2006.01) | |
| *B60L 11/18* | (2006.01) | |
| *B60W 10/08* | (2006.01) | |

(52) U.S. Cl.
CPC ............ *B60L 11/005* (2013.01); *B60L 11/12* (2013.01); *B60L 11/123* (2013.01); *B60L 11/14* (2013.01); *B60L 11/1861* (2013.01); *B60W 10/08* (2013.01); *B60W 10/26* (2013.01); *B60W 10/30* (2013.01); *B60W 20/00* (2013.01); *E02F 9/2079* (2013.01); *E02F 9/2221* (2013.01); *B60L 2210/10* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2250/26* (2013.01); *B60L 2260/28* (2013.01); *B60W 2510/305* (2013.01); *B60W 2710/244* (2013.01); *Y02T 10/6217* (2013.01); *Y02T 10/642* (2013.01); *Y02T 10/705* (2013.01); *Y02T 10/7005* (2013.01); *Y02T 10/7022* (2013.01); *Y02T 10/7044* (2013.01); *Y02T 10/7077* (2013.01); *Y02T 10/7216* (2013.01); *Y02T 10/7241* (2013.01); *Y02T 10/92* (2013.01); *Y10S 903/93* (2013.01)

(56) References Cited

U.S. PATENT DOCUMENTS

| | | | | |
|---|---|---|---|---|
| 5,927,415 | A * | 7/1999 | Ibaraki | B60K 6/48 180/65.25 |
| 6,381,522 | B1 * | 4/2002 | Watanabe | B60K 6/48 180/65.25 |
| 8,022,674 | B2 * | 9/2011 | Miura | B60W 20/00 180/65.29 |
| 9,276,425 | B2 * | 3/2016 | Ture | H02J 7/0052 |
| 2001/0035739 | A1 * | 11/2001 | Laig-Horstebrock | G01R 31/3662 320/132 |
| 2006/0033469 | A1 * | 2/2006 | Beaty | B60L 3/0046 320/104 |
| 2007/0096555 | A1 * | 5/2007 | Seay | B60K 6/12 303/152 |
| 2008/0029320 | A1 * | 2/2008 | Fleckner | B60K 6/48 180/65.265 |
| 2009/0118950 | A1 * | 5/2009 | Heap | B60K 6/387 701/55 |
| 2009/0299586 | A1 * | 12/2009 | Miller | B60K 6/365 701/54 |
| 2010/0026244 | A1 * | 2/2010 | Iida | B66B 5/027 320/134 |
| 2010/0280697 | A1 * | 11/2010 | Yanagisawa | E02F 9/2246 701/22 |
| 2011/0066308 | A1 * | 3/2011 | Yang | B60W 20/12 701/22 |
| 2011/0098873 | A1 * | 4/2011 | Koga | E02F 9/123 701/22 |
| 2011/0264317 | A1 * | 10/2011 | Druenert | B60K 6/48 701/22 |
| 2011/0313613 | A1 * | 12/2011 | Kawahara | H01M 10/441 701/34.4 |
| 2012/0209463 | A1 * | 8/2012 | Gibbs | B60K 6/46 701/22 |
| 2012/0296502 | A1 * | 11/2012 | Mehr | B60L 11/00 701/22 |
| 2013/0068544 | A1 * | 3/2013 | Itou | B62D 11/003 180/6.5 |
| 2013/0071214 | A1 * | 3/2013 | Itou | B60K 6/48 414/685 |
| 2013/0096747 | A1 * | 4/2013 | Hussain | B60W 10/06 701/22 |
| 2013/0096749 | A1 * | 4/2013 | Hussain | B60K 6/46 701/22 |
| 2013/0193892 | A1 * | 8/2013 | Ishihara | B60W 10/06 318/454 |
| 2013/0200845 | A1 * | 8/2013 | Bito | H02J 7/0042 320/109 |
| 2013/0211650 | A1 * | 8/2013 | Tashiro | B60W 10/06 701/22 |
| 2013/0304292 | A1 * | 11/2013 | Moriki | B60L 7/14 701/22 |
| 2013/0317684 | A1 * | 11/2013 | Kaneko | E02F 9/2075 701/22 |
| 2013/0341923 | A1 * | 12/2013 | Ju | H02J 7/007 290/48 |
| 2014/0163804 | A1 * | 6/2014 | Kaneko | B60K 6/46 701/22 |
| 2014/0165548 | A1 * | 6/2014 | Satake | E02F 9/2075 60/420 |
| 2014/0288742 | A1 * | 9/2014 | Hokoi | B60W 20/40 701/22 |
| 2014/0350875 | A1 * | 11/2014 | Mullin | G01R 31/3651 702/63 |
| 2015/0046011 | A1 * | 2/2015 | Imai | B60K 6/52 701/22 |
| 2015/0077063 | A1 * | 3/2015 | Tsukamoto | H02S 50/00 320/134 |
| 2015/0142232 | A1 * | 5/2015 | Tabata | B60K 6/445 701/22 |
| 2015/0144408 | A1 * | 5/2015 | Ishihara | B60L 11/14 180/53.4 |
| 2015/0217757 | A1 * | 8/2015 | Okamoto | B60W 20/106 701/22 |
| 2015/0267380 | A1 * | 9/2015 | Kaneko | B60K 6/46 701/22 |
| 2015/0309547 | A1 * | 10/2015 | Huang | G06F 1/263 307/80 |
| 2016/0059728 | A1 * | 3/2016 | Lee | B60L 11/1861 318/139 |
| 2016/0097405 | A1 * | 4/2016 | Hoshino | B60K 6/485 60/428 |
| 2016/0153374 | A1 * | 6/2016 | Tashiro | F02D 41/10 701/103 |
| 2016/0167641 | A1 * | 6/2016 | Yoon | B60W 20/13 701/22 |

FOREIGN PATENT DOCUMENTS

| | | |
|---|---|---|
| JP | 2001-16704 A | 1/2001 |
| JP | 2001-219039 A | 8/2001 |
| JP | 2001-268719 A | 9/2001 |
| JP | 2003-47108 A | 2/2003 |
| JP | 2003-235108 A | 8/2003 |
| JP | 2005-210841 A | 8/2005 |
| JP | 2008-162346 A | 7/2008 |
| JP | 2012-62003 A | 3/2012 |
| WO | 2010/143628 A1 | 12/2010 |

* cited by examiner

HYBRID WORK VEHICLE WITH LOAD DEPENDENT TARGET STATE OF CHARGE

TECHNICAL FIELD

The present invention relates to a work vehicle equipped with an engine and an electric motor as the power source.

BACKGROUND ART

In recent years, environmental concerns and soaring crude oil prices have reinforced preferences for energy-saving industrial products. For example, in the automotive field, hybrid vehicles each equipped with an engine and a motor (electric) as the power source have already been marketed. A similar trend has been observed in the field of work vehicles (e.g., construction vehicles and industrial vehicles) that are mostly furnished with a hydraulic drive system using a diesel engine. There have been growing numbers of electrically driven, highly efficient, energy-saving work vehicles. If, for example, the driving part of work vehicles is electrified, i.e., if their driving source is a motor, numerous energy-saving benefits are expected, such as reduced exhaust fumes, highly efficient engine drive (in the case of the engine-equipped hybrid type), enhanced efficiency in power transmission, and recovery of regenerated power. In the field of such work vehicles, growing numbers of forklifts have been electrified. So-called "battery forklifts" driven by a motor using battery power have been commercialized.

As part of engine-driven hydraulic excavators and forklifts, so-called "hybrid vehicles" equipped with a diesel engine and a motor as the driving source have recently started to be commercialized. When constructed as a hybrid work vehicle, the wheel loader is expected to offer the effect of reducing fuel consumption. Ordinary wheel loaders are work vehicles that travel by having engine power transmitted to the wheels through a torque converter and a gear transmission (T/M) while excavating and transporting gravel with a bucket part of the work device mounted at the front of the vehicle. If the traveling drive part of this type of wheel loader is electrified, it is possible to improve the efficiency of power transmission through the torque converter and gear transmission up to the level of electrical power transmission. Furthermore, since the wheel loader frequently starts and stops during traveling while working, if the traveling drive part is electrified, the power regenerated from the electric traction motor at the time of braking is expected to be recovered.

One such wheel loader operates on a series type hybrid system and includes a motor generator mechanically coupled to an engine, a first inverter controlling the motor generator, an electric traction motor mechanically coupled to the output shaft (propeller shaft) of a traveling part, a second inverter controlling the electric traction motor, and an electrical storage device electrically coupled to the first and the second inverters via a DC-DC converter. The basic workings of this system involve primarily getting the engine to drive the motor generator to generate electric power and causing the electric traction motor to generate torque with the generated power to run the vehicle while controlling the system voltage (DC bus voltage between each of the inverters) to the predetermined value by the electrical storage device and the DC-DC converter. Also, the electrical storage device of a relatively large capacity is used in this system. As such, the electrical storage device functions not only as a power source that holds the system voltage to a predetermined level as mentioned above, but also as an assist power source at the time of engine power deficiency and as an electric power sink to absorb regenerated power from the electric traction motor during regenerative braking. For example, the electrical storage device may be a large-capacity electrical double layer capacitor or a secondary battery typified by lithium ion batteries and Ni-MH batteries.

As one technique for charging and discharging control of the electrical storage device on such a hybrid work vehicle, there exists a hybrid hydraulic excavator (construction machine) that includes a motor generator control part that controls a motor generator driven by an engine, a charging and discharging control part that controls charging and discharging between a first capacitor and a second capacitor interconnected electrically, a motor connected electrically to the second capacitor, and a control device that lowers a target charge value of at least one of the first and the second capacitors before the motor starts regenerative operation (WO2010/143628).

PRIOR ART LITERATURE

Patent Literature

Patent Literature 1: WO2010/143628

SUMMARY OF THE INVENTION

Problem to be Solved by the Invention

One benefit provided by the above-cited technique is that the overcharging of a capacitor is suppressed by lowering beforehand the target charge value of that capacitor when the motor is expected to regenerate electrical power, so that regenerated electrical energy is effectively utilized. That is, the above-cited technique makes it possible to implement efficient operation by use of regenerated power as one feature of the hybrid vehicle.

However, merely lowering the target charge value in motor regeneration mode can make it difficult to provide assist power necessary for the hybrid vehicle to continuously perform, say, a relatively high load operation. For example, if the capacitor (electrical storage device) is an electrical double layer capacitor, the electrical capacity of the capacitor being smaller than that of secondary batteries may conceivably limit its power because of a lack of assist power if high load operation continues. Further, even when the electrical storage device is a secondary battery, it may conceivably become necessary to limit discharging power if the state of charge (called the SOC hereunder where appropriate) is at a low level.

Thus an object of the present invention is to provide a hybrid type work vehicle equipped with an electrified driving part, the work vehicle being capable of continuing to work without powering down even when performing high load operation continuously.

Means for Solving the Problem

In achieving the above-stated object, the present invention provides a work vehicle comprising: a motor generator driven by an engine; a hydraulic pump driven by at least either of the motor generator and the engine; a work device driven by hydraulic fluid from the hydraulic pump; an electric traction motor for driving wheels; an electrical storage device connected to the motor generator and to the electric traction motor and charged electrically on the basis of a target SOC; and a control device varying the target SOC for the electrical storage device on the basis of total demanded power of the hydraulic pump and the electric traction motor.

Effect of the Invention

According to the present invention, it is possible for the work vehicle to continue working without powering down even when continuously performing high load operation.

MODE FOR CARRYING OUT THE INVENTION

Some embodiments of the present invention are explained below with reference to the accompanying drawings.

Figure 1:
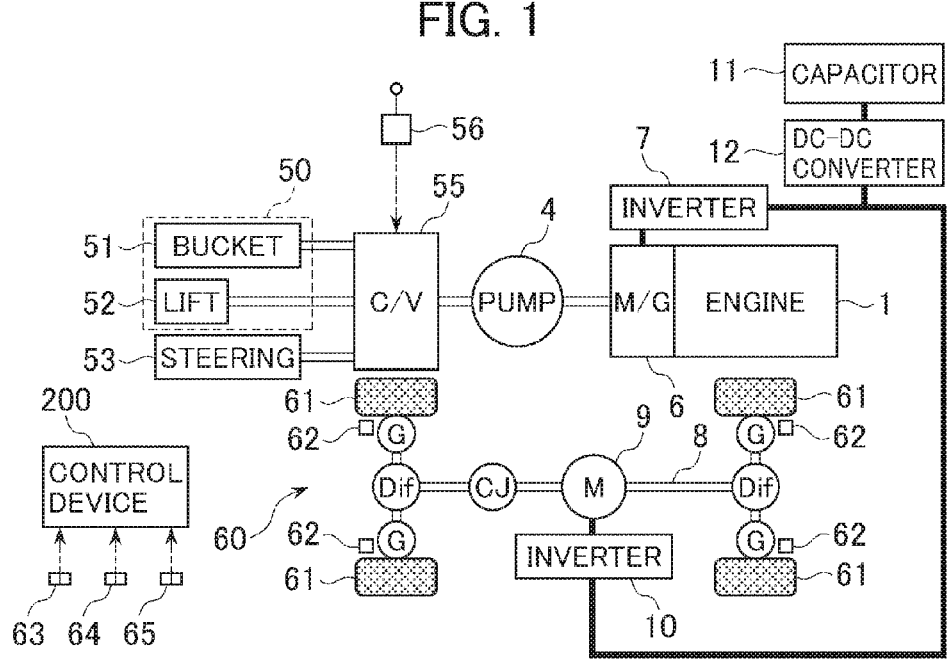
FIG. 1 is a system configuration diagram of a hybrid wheel loader as one embodiment of the present invention.

FIG. 1 is a system configuration diagram of a hybrid wheel loader as one embodiment of the present invention. The wheel loader shown in this drawing is structured as a series type hybrid system. The wheel loader includes: a diesel engine 1; a motor generator (M/G) 6 coupled mechanically to and driven by the engine 1; an inverter device 7 controlling the motor generator 6; a hydraulic pump 4 coupled mechanically to the motor generator 6 and driven by at least either of the motor generator 6 and engine 1; a work device 50 having a bucket and a lift arm (not shown), mounted at the front of the vehicle body, and driven by hydraulic fluid from the hydraulic pump 4; hydraulic actuators (bucket cylinder 51, lift cylinder 52, and steering cylinder 53) driven by the hydraulic fluid supplied from the hydraulic pump 4 via a control valve 55; a track structure 60 having four wheels 6; an electric traction motor 9 attached to a propeller shaft 8 of the track structure 60 and driving the four wheels 61; an inverter device 10 controlling the electric traction motor 9; an electrical storage device 11 connected electrically to inverters 7 and 10 (of the motor generator 6 and electric traction motor 9) via a DC-DC converter 12 and exchanging DC power directly with the inverters 7 and 10; an operating device (control lever 56 and steering wheel (not shown)) used for outputting operation signals for driving the hydraulic actuators 51, 52 and 53 in accordance with an operation amount; and a control device 200.

The bucket cylinder 51 and lift cylinder 52 are driven on the basis of operation signals (hydraulic signals) output in keeping with the operation amount of the control lever 56 installed in the cab. The lift cylinder 52, attached to the lift arm fixed rotatably to the front of the vehicle body, rotates the lift arm up and down by extending and contracting on the basis of the operation signal output by operating the control lever 56. The bucket cylinder 51, attached to the bucket fixed rotatably to the tip of the lift arm, rotates the bucket up and down by extending and contracting on the basis of the operation signal output by operating the control lever 56. The steering cylinder 53 is driven in accordance with an operation signal (hydraulic signal) output on the basis of a steering amount of the steering wheel (not shown) installed in the cab. The steering cylinder 53 is coupled to each of the wheels 61, and changes the steering angle of the wheels 61 by extending and contracting on the basis of the operation signal output by operating the steering wheel.

Also, the wheel loader in FIG. 1 includes a forward/reverse switch (forward/reverse switching device) 63, a work mode switch (work mode switching device) 64, and a charging mode switch (charging mode switching device) 65.

The forward/reverse (F/R) switch 63 is a switch for switching the traveling direction of the work vehicle between forward and reverse. The information on the switching position of the switch 63 is output as a forward/reverse signal (switch signal) to the hybrid control device 20.

The work mode switch 64 is a switch (P/E switch) for switching the work mode of the work vehicle between power (P) mode emphasizing workload and economy (E) mode emphasizing efficiency. The information on the switching position of the switch 64 is output as a work mode signal (switch signal) to the hybrid control device 20. The combination of a maximum engine revolution speed and a maximum hydraulic pump capacity is determined beforehand for each work mode. With this embodiment, power (P) mode is set to permit a relatively high engine revolution speed and a relatively large capacity. That is, the maximum value of the total output of the hydraulic pump 4 and electric traction motor 9 is varied in keeping with the switching position of the work mode switch 64. Power (P) mode permits a larger maximum value of the total output than economy (E) mode. Although the case explained here assumes that two modes are switched, there may be provided three or more work modes as well.

The charging mode switch 65 is a switch for switching the charging of the electrical storage device 11 between a mode giving higher priority to charging the electrical storage device 11 than to workload (preferential charging mode) and another mode not giving priority to charging the electrical storage device 11 (normal mode). The information on the switching position of the switch 65 is output as a charging mode signal (switch signal) to the hybrid control device 20. The difference between the two charging modes is that the target SOC is set to be relatively higher in preferential charging mode than in normal mode. When preferential charging mode is selected with this embodiment, the target SOC is set to be higher during intermediate load operation (discussed later) than if normal mode is selected. A typical case in which the operator selects preferential charging mode is when the vehicle performs work involving active utilization of the electric power from the electrical storage device (i.e., heavy load work).

The electrical storage device 11 is not specifically limited in type and may be a large-capacity electrical double layer capacitor or a secondary battery such as a lithium ion battery, a nickel hydride battery, or a lead battery. With this embodiment, it is assumed that a lithium ion battery is used as the electrical storage device 11. The electrical storage device 11 of this embodiment performs step-up/down control of the battery voltage using the DC-DC converter 12 and exchanges electric power directly with the inverters 7 and 10 (i.e., with the motor generator 6 and electric traction motor 9).

Explained above is the case in which electric power is exchanged between the electrical storage device 11 and a DC bus 13 via the DC-DC converter 12 installed therebetween. If the voltage of the electrical storage device 11 is equivalent to the system voltage of this hybrid system, then the DC-DC converter 12 may be omitted. In this case, the DC bus 13 may be connected directly with the electrical storage device 11.

The hybrid wheel loader structured as described above performs work for a specific purpose by getting the hydraulic pump 4 to supply suitable hydraulic pressure to the work device 50 for excavating gravel, for example. The track structure 60 travels by having the electric traction motor 9 driven by use of electric power generated by the motor generator 6 primarily through the use of power from the engine 1. At this point, the electrical storage device 11 may absorb electric power regenerated by the electric traction motor 9 during braking of the vehicle or supply stored electric power to the motor generator 6 or electric traction motor 9 to assist the engine 1 in its output. In this manner, the electrical storage device 11 contributes to reducing the energy consumption of the vehicle.

Figure 2:
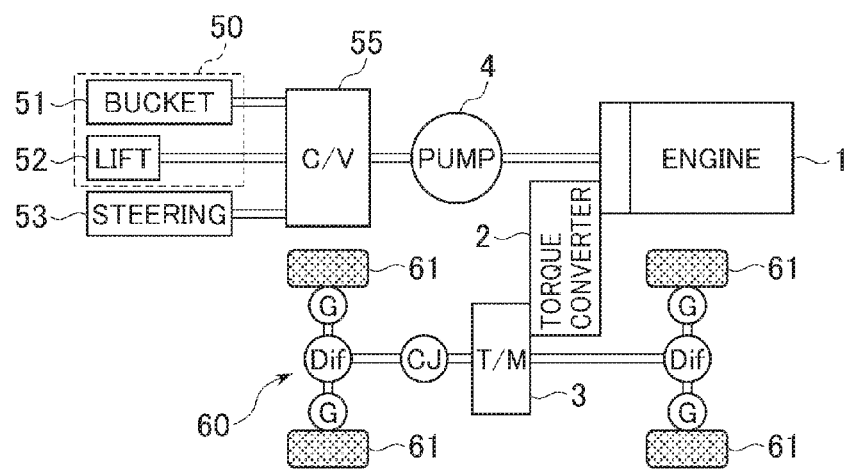
FIG. 2 is a diagram showing a representative configuration of the prior-art wheel loader.

FIG. 2 is a diagram showing a representative configuration of the prior-art wheel loader. In this drawing, the same reference characters as those in FIG. 1 designate the same or corresponding components, and their explanations are omitted hereunder (the same will also apply to the subsequent drawings). The prior-art wheel loader shown in FIG. 2 is equipped with a track structure 60 and a work device 50 (with a lift and a bucket part) as the primary driving part. The wheel loader travels by having the power of the engine 1 transmitted to the wheels 61 via the torque converter 2 and gear transmission (T/M) 3, and excavates and transports gravel and the like using the work device 50 driven by the hydraulic pump 4. Since the mechanical efficiency of power transmission of the torque converter is inferior to the electrical efficiency of power transmission, if the traveling drive section of the wheel loader in FIG. 2 is electrified (including the use of a parallel hybrid structure), the efficiency of power transmission from the engine 1 can be improved. Furthermore, because the wheel loader during work starts and stops frequently while traveling, if the traveling drive section is electrified as mentioned above, then regenerated power is expected to be recovered from the electric traction motor 9 at the time of braking. In this manner, when the driving device of the wheel loader is partially electrified to make up a hybrid structure, fuel consumption amount can be lowered.

Figure 3:
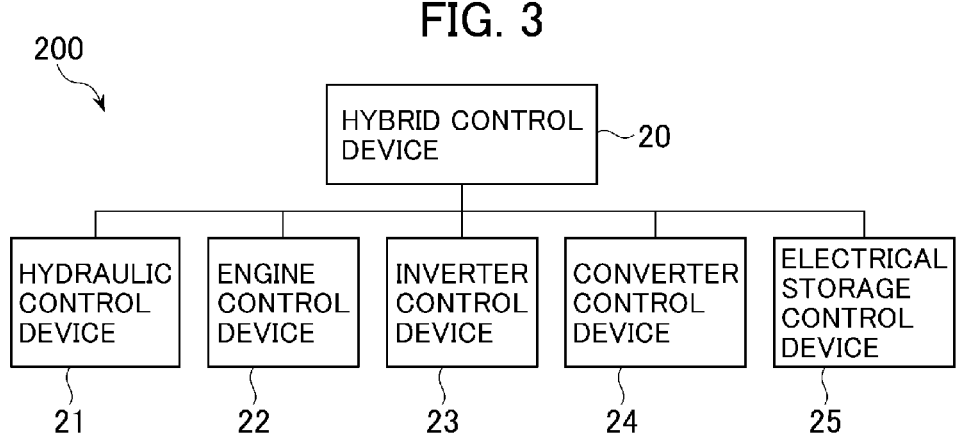
FIG. 3 is a configuration diagram of a control device mounted on the wheel loader as the embodiment of the invention.

FIG. 3 is a configuration diagram of the control device 200 mounted on the wheel loader as the embodiment of the invention. As shown in this drawing, the wheel loader (vehicle) embodying the present invention has the control device 200 made up of a hybrid control device 20 as a controller controlling the energy flow and power flow of the entire hybrid system shown in FIG. 1; a hydraulic control device 21 controlling a control valve (C/V) 55 and a hydraulic pump 4; an engine control device 22 controlling the engine 1; an inverter control device 23 controlling inverters 7 and 10; a converter control device 24 controlling a DC-DC converter 12; and an electrical storage control device 25 managing the state of charge (SOC) of the electrical storage device 11 and detecting any error therein. In many cases, the electrical storage control device 25 is used to detect such conditions as the voltage of the electrical storage device 11.

In terms of hardware, the control devices 20, 21, 22, 23, 24 and 25 are each equipped with an arithmetic processing unit (e.g., CPU, not shown) executing various control programs, a storage device (e.g., ROM or RAM; not shown) storing various items of data, and an input/output device (not shown) through which various items of data are input and output. Also, the control devices 20, 21, 22, 23, 24 and 25 are interconnected via a CAN (Controller Area Network) and exchange device command values and state quantities with one another. As shown in FIG. 3, the hybrid control device 20 is positioned hierarchically above the hydraulic control device 21, engine control device 22, inverter control device 23, converter control device 24, and electrical storage control device 25. As such, the hybrid control device 20 controls the system as a whole, giving specific operation commands to the individual control devices 21 through 25 in such a manner that the entire system will provide maximum work performance.

The control devices 20 through 25 shown in FIG. 3 are only controllers needed to control the driving parts of the hybrid system indicated in FIG. 1. In practice, implementing the vehicle requires installing additional monitors and information-related controllers which are not shown here since they are not directly relevant to the present invention. Also, the enclosures of the control devices 20 through 25 need not be separated from one another as shown in FIG. 3. Two or more control functions may be incorporated in a single control device. In the drawings, the inverter control device 23 alone is shown to control the two motors 6 and 9.

Figure 4:
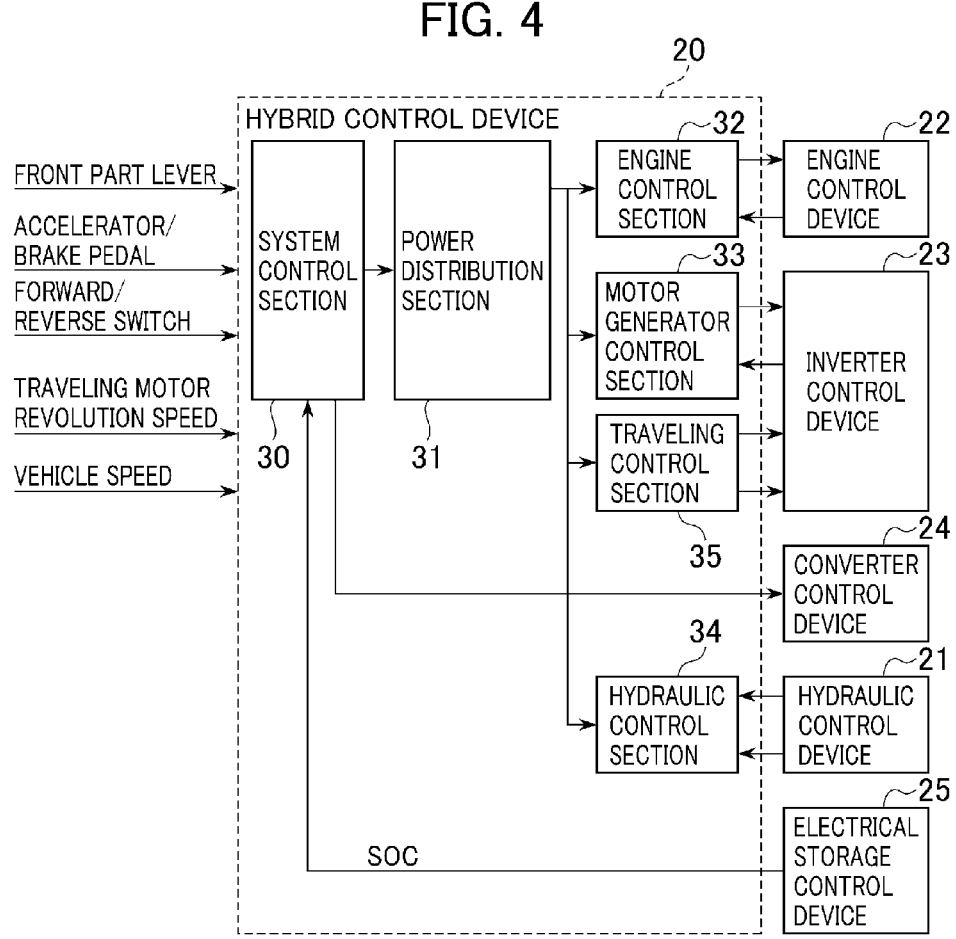
FIG. 4 is a configuration diagram of a hybrid control device as part of the embodiment of the invention.

FIG. 4 is a configuration diagram of the hybrid control device 20 as part of the embodiment of the invention. The hybrid control device 20 shown in FIG. 4 includes a system control section 30, a power distribution section 31, an engine control section 32, a motor generator (M/G) control section 33, a traveling control section 35, and a hydraulic control section 34.

The system control section 30 controls the entire hybrid system. The power distribution section 31 performs the process of distributing the output of the engine 1 and the electric power of the electrical storage device 11 to the individual driving parts (hydraulic pump 4, motor generator 6, and electric traction motor 9). The engine control section 32 determines a revolution speed command for the engine 1 in accordance with a demanded power value (total demanded power value) of the entire vehicle that totals the power value demanded by the hydraulic pump 4 (of work device 50) (demanded hydraulic power value Pf) and the power value demanded by the electric traction motor 9 (demanded traveling power value Prun). The motor generator control section 33 determines a torque command for the motor generator 6 in accordance with a demanded power generation amount. The hydraulic control section 34 calculates a tilting angle command value for the hydraulic pump 4 on the basis of the demanded power value Pf of the hydraulic pump 4 calculated from output of the motor generator control section 33 and from the operation amount of the control lever 56. The traveling control section 35 calculates a torque command for the electric traction motor 9 on the basis of the demanded traveling power value Prun calculated from the stepping amount of the accelerator or brake pedal and from the current vehicle speed.

Input to the hybrid control device 20 are the operation signal (including operation amount) output by operating the control lever (front part lever) 56, the switch signal (forward/reverse signal) from the forward/reverse switch 63, the vehicle speed calculated from the revolution speed of the wheels 61 detected by a speed sensor (wheel speed detection means) 62, the revolution speed of the electric traction motor 9 output from the inverter 10, the revolution speed of the engine 1 (engine revolution speed), and the current SOC of the electrical storage device 11 calculated by the electrical storage control device 25. The vehicle speed of the wheel loader may be calculated alternatively by the hybrid control device 20 admitting input of the detection value from the speed sensor 62.

The power distribution section 31 determines an ultimate engine output (engine output value Pe) by use of the total demanded power value as the sum of the demanded hydraulic power value Pf and demanded traveling power value Prun, in consideration of an efficiency level estimated from the range of engine revolution speeds available at that point. The output of the electrical storage device 11 (electrical storage device output value Pc) at this point is determined in a manner compensating for a lack of engine output in the total demanded power value, with the SOC also taken into consideration. As described, in keeping with the total demanded power value (Pf+Prun) at the present time, the hybrid system determines the output of the engine 1 and that of the electrical storage device 11 in a manner optimizing the efficiency of the entire system, and supplies the control devices with suitable commands to operate the vehicle.

Figure 5:
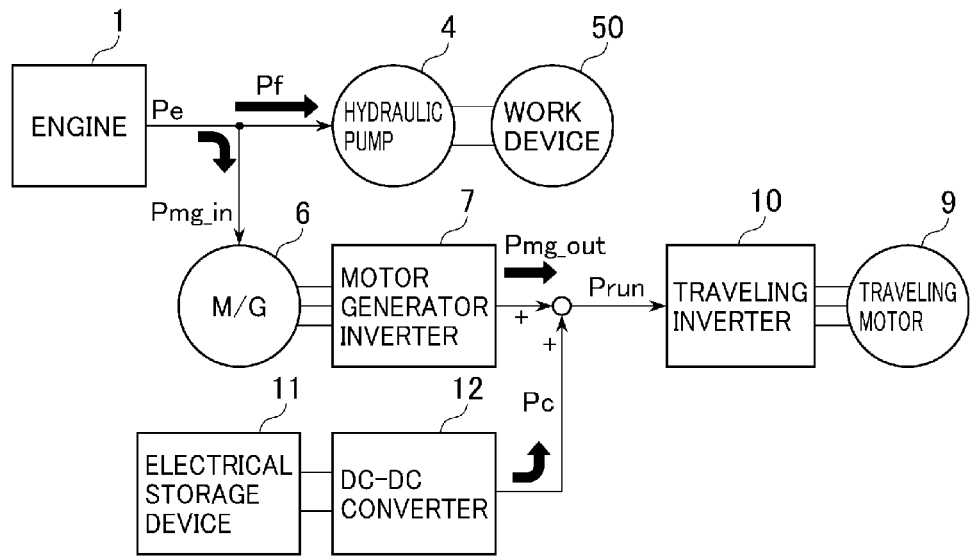
FIG. 5 is a power flow diagram of a hybrid system as part of the embodiment of the invention.

FIG. 5 is a power flow diagram of the hybrid system as part of the embodiment of the invention. This hybrid system is equipped with the engine 1 and electrical storage device 11 as the power source for driving the vehicle. As illustrated in FIG. 5, the power distribution section 31 performs the process of distributing the engine output Pe and electrical storage device output Pc to the work device 50 for the output Pf and to the electric traction motor 9 for the output Prun. The terms "Pmg_in" and "Pmg_out" in the following expressions (1) and (2) represent the input power and output power of the motor generator 6, respectively:

$$Pf = Pe - Pmg\_in \qquad \text{Eq. (1)}$$

$$Prun = Pmg\_out + Pc \qquad \text{Eq. (2)}$$

If the sum of the demanded power value of the work device 50 (demanded hydraulic power value Pf) and the demanded power value of the electric traction motor 9 (demanded traveling power value Prun) is smaller than the sum of the output upper limits Pe and Pc (available hybrid output upper limits), the hybrid control device 20 allows the system control section 30 to determine the manner in which fuel consumption is the highest, and causes the power distribution section 31 to supply the work device 50 and electric traction motor 9 with command values in keeping with their respective demanded power values, thereby operating the vehicle.

Figure 6:
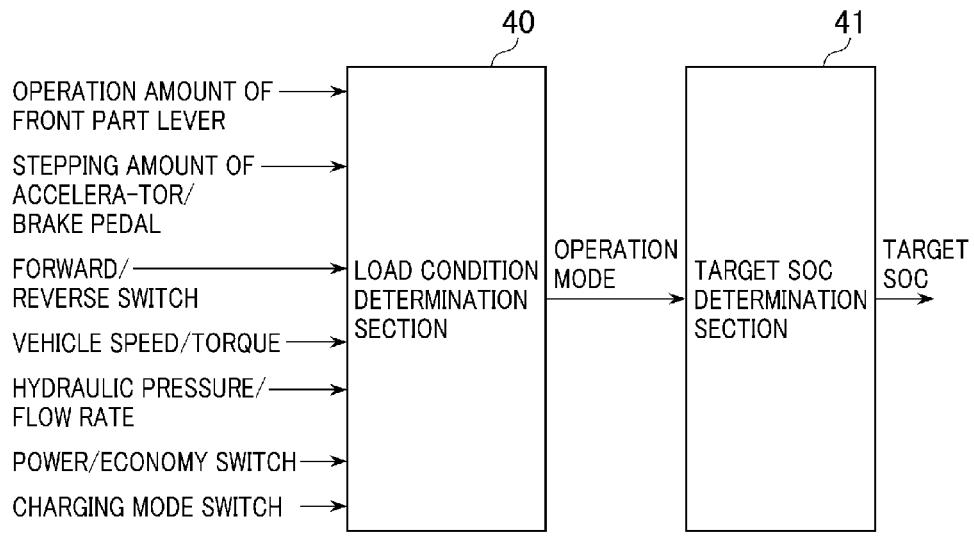
FIG. 6 is another configuration diagram of the hybrid control device as part of the embodiment of the invention.

FIG. 6 is another configuration diagram of the hybrid control device 20 as part of the embodiment of the invention. As shown in this drawing, the hybrid control device 20 includes a load condition determination section 40 and a target SOC determination section 41. These sections combine to perform the process of varying the target SOC for the electrical storage device 11 in accordance with the magnitude (vehicle load condition) of the total demanded power value (Pf+Prun).

Input to the load condition determination section 40 are the operation amount of the control lever 56 (front part lever operation amount), the stepping amount of the accelerator or brake pedal, the forward/reverse signal of the forward/reverse (F/R) switch 63, the vehicle speed, the torque of the electric traction motor 9, the pressure and flow rate of the hydraulic pump 4 (obtainable from the tilting angle of the pump 4 and from a pressure sensor installed on the delivery side of the pump 4), the work mode signal of the work mode switch (P/E switch) 64, and the charging mode signal of the charging mode switch 65. On the basis of these input values, the load condition determination section 40 calculates the demanded power (Pf, Prun) of the hydraulic pump 4 and electric traction motor 9. In particular, given the operation amount of the control lever 56 and the stepping amount of the accelerator or brake pedal, the load condition determination section 40 can determine the magnitude of the load. By use of these input values combined with the vehicle speed, the torque of the electric traction motor 9, and the pressure and flow rate of the hydraulic pump 4, the load condition determination section 40 can calculate the actual power of the traveling drive part (electric traction motor 9) and that of the hydraulic drive part (hydraulic pump 4). This makes it possible to improve the accuracy of calculating demanded power, which in turn enhances the accuracy of making subsequent operating determinations.

Furthermore, the load condition determination section 40 determines the load condition of the work vehicle by considering, as needed, the SOC of the electrical storage device 11 and the switching positions of the switches 64 and 65, in addition to the total demanded power value (Pf+Prun) as the sum of the demanded power of the hydraulic pump 4 and electric traction motor 9. With this embodiment, the load conditions of the work vehicle are classified into three categories. Specifically, the three categories that the load condition of the vehicle falls into are (1) heavy load, (2) intermediate load, and (3) light load. The load conditions (target SOC) are thus classified into more detailed categories in accordance with the SOC of the electrical storage device 11 and the positions of the switches 64 and 65.

The result of the determination made by the load condition determination section 40 is input to the target SOC determination section 41. The target SOC determination section 41 performs the process of determining the target SOC for the electrical storage device 11 in accordance with the load condition determined by the load condition determination section 40. The target SOC to be selected by the target SOC determination section 41 for a given load condition is determined beforehand, as will be discussed later; the target SOC is varied with the load condition in effect. The target SOC determined by the target SOC determination section 41 is output to the system control section 30 in the hybrid control device 20 and used in generating the torque command for the motor generator 6 (to be discussed later).

Explained next are the load condition determination process and target SOC determination process performed respectively by the load condition determination section 40 and target SOC determination section 41 as part of this embodiment.

Figure 7:
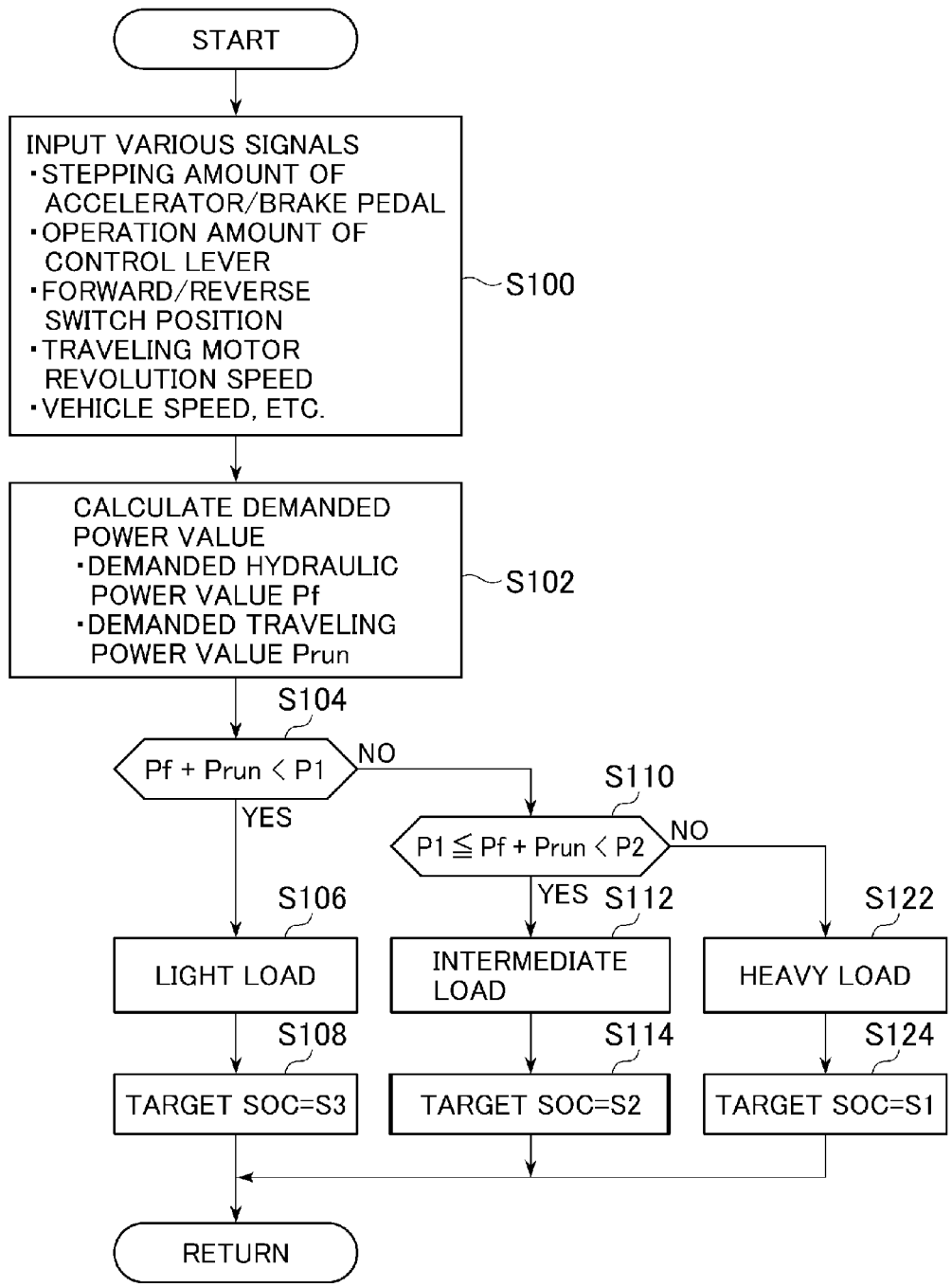
FIG. 7 is a flowchart of processes performed by a load condition determination part and a target SOC determination part as part of the embodiment of the invention.

FIG. 7 is a flowchart of the processes performed by the load condition determination section 40 and target SOC determination section 41. As shown in this drawing, the load condition determination section 40 first inputs various signals shown in FIG. 6 (S100). The load condition determination section 40 then calculates the demanded hydraulic power value Pf and demanded traveling power value Prun based on the stepping amount of the accelerator or brake pedal and on the operation amount of the control lever 56 (S102).

The load condition determination section 40 determines whether the total demanded power value (Pf+Prun) is smaller than a set value P1 (S104). The set value P1 is a value established for the purpose of allowing the load condition determination section 40 to determine whether the load condition of the work vehicle is "light load," the lightest of the above-mentioned three load condition categories for the work vehicle. The set value P1 is set to be smaller than another set value P2 (P1<P2), to be discussed later. The light load for this embodiment is assumed to be the condition in which the load can be addressed solely by the output of the engine 1. Under this assumption, the set value P1 should preferably be smaller than the maximum value of the engine output Pe.

If the total demanded power value is found to be smaller than the set value P1 in S104, the load condition determination section 40 determines that the load condition is "light load" (S106). Given the input of this determination, the target SOC determination section 41 sets the target SOC to a set value S3 (S108). Here, the set value S3 is larger than the target SOC (set value S2) for the "intermediate load" and also larger than the target SOC (set value S1) for the "heavy load." Whereas the set value S3 varies with the type and specifications of the electrical storage device 11, the set value S3 in this context is a value equal or close to the upper limit of the target SOC set so as to prevent the overcharge of the electrical storage device 11. With this embodiment, the set value S3 is assumed to be 70% of output for explanation purposes. Once the target SOC is set, control is returned to the beginning of the process, and S100 and the subsequent steps are repeated.

On the other hand, if the total demanded power value is found to be larger than the set value P1 in S104, the load condition determination section 40 determines whether the total demanded power value is smaller than the set value P2 (S110). The set value P2 is a value established for the purpose of allowing the load condition determination section 40 to determine whether the load condition of the work vehicle is "intermediate load" or "heavy load" from among the above-mentioned three categories. If the total demanded power value is found to be smaller than the set value P2 (P1≤Pf+Prun<P2), the load condition determination section 40 determines that the load condition is "intermediate load." With this embodiment, "intermediately load" is assumed to be the condition in which the time average load falls within the output range of the engine 1 but in which dealing with the load needs to be assisted at certain times by the output of the electrical storage device 11 (i.e., a condition where the output range of the engine 1 is sometimes exceeded). Further, "heavy load" is assumed to be the condition in which dealing with the load needs to be assisted continuously by the output of the electrical storage device 11. Under these assumptions, the set value P2 may be set to be larger than the maximum value of the engine output Pe, for example.

If the total demanded power value is found to be smaller than the set value P2 in S110, the load condition determination section 40 determines that the load condition is "intermediate load" (S112). Given the input of this determination, the target SOC determination section 41 sets the target SOC to the set value S2 (S114). Here, the set value S2 is set to be larger than the target SOC for the heavy load (set value S1) and smaller than the set value SOC for the light load (set value S3) (S1<S2<S3). Whereas the set value S2 varies with the type and specifications of the electrical storage device 11, the set value S2 in this context is assumed to be equivalent to an intermediate value of the ordinary operating range of the electrical storage device 11. With this embodiment, the set value S2 is assumed to be 50% of output for explanation purposes. Once the target SOC is set, control is returned to the beginning of the process, and S100 and the subsequent steps are repeated. Alternatively, instead of the above-mentioned set value (50%), the set value S2 to be determined by the target SOC determination section 41 may be the SOC value of the electrical storage device 11 at that point in time (i.e., current SOC value). That is, adopted in this case are the settings ensuring that power is generated so that the current SOC value is maintained.

If the total demanded power value is found to be larger than the set value P2 in S110, the load condition determination section 40 determines that the load condition is "heavy load" (S122). Given the input of this determination, the target SOC determination section 41 sets the target SOC to the set value S1 (S124). Whereas the set value S1 varies with the type and specifications of the electrical storage device 11, the set value S1 in this context is a value equal or close to the lower limit of the target SOC set so as to prevent the over-discharge of the electrical storage device 11. With this embodiment, the set value S1 is assumed to be 30% of output for explanation purposes. Once the target SOC is set to S1, control is returned to the beginning of the process, and S100 and the subsequent steps are repeated.

When the processes are carried out as explained above according to the flowchart shown in FIG. 7, the target SOC for the electrical storage device 11 is set to be the higher the lower the total demanded power is.

Figure 8:
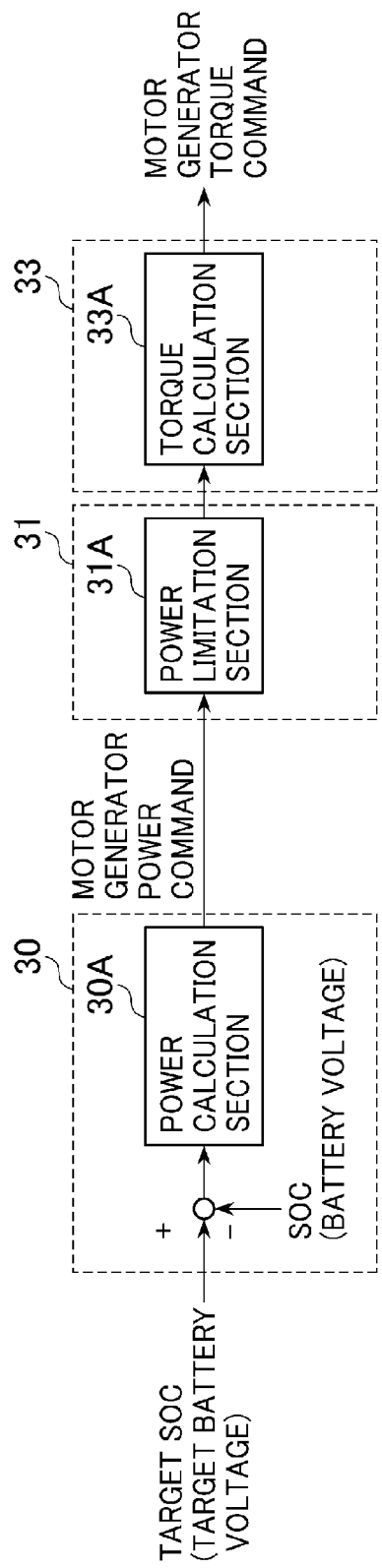
FIG. 8 is yet another configuration diagram of the hybrid control device as part of the embodiment of the invention.

FIG. 8 is yet another configuration diagram of the hybrid control device 20 as part of the embodiment of the invention. This drawing shows the system control section 30, power distribution section 31, and motor generator (M/G) control section 33. The target SOC determined as per the flowchart in FIG. 7 is input to the system control section 30. On the basis of the deviation between the current SOC of the electrical storage device 11 input from the electrical storage control device 25 on the one hand and the target SOC on the other hand, the system control section 30 causes a power calculation section 30A to calculate a power generation command (M/G power command) for the motor generator 6 for use in charging the electrical storage device 11, and outputs the power generation command thus calculated to the power distribution section 31. That is, the power generated by the motor generator 6 is subjected to feedback control based on the deviation between two SOC settings.

In accordance with the conditions of the engine 1 and work device 50, the power distribution section 31 causes a power limitation section 31A to perform the process of limiting the power generation command and outputs the power generation command thus limited to the motor generation control section 33. The motor generator control section 33 causes a torque calculation section 33A to calculate an ultimate torque command for the motor generator 6 and outputs this torque command to the inverter control device 23 that controls the motor generator 6. In this manner, the SOC of the electrical storage device 11 is controlled to approach the target SOC determined according to the flowchart in FIG. 7.

Explained above is the case in which the current SOC is fed back to attain the target SOC in carrying out SOC control of the electrical storage device 11. Alternatively, the SOC may be replaced with the OCV (open circuit voltage) of the electrical storage device 11. Furthermore, although it is explained above that the command value of an SOC control system for the electrical storage device 11 is the motor generator torque command value, this is not limitative of the present invention. Alternatively, current control of the electrical storage device 11 may be performed through the use of the DC-DC converter 12 shown in FIG. 3.

With the work vehicle structured as described above, if the load condition determination section 41 first determines that the load condition is "light load," the target SOC for the electrical storage device 11 is set to S3 (high level). When it is determined that the load condition is "light load," that means the output of the engine 1 provides some extra power to spare as discussed above. For this reason, if the SOC of the electrical storage device 11 is raised sufficiently high (i.e., charged) by actively operating the motor generator 6 for power generation, it is possible to avoid the case where the remaining capacity of the electrical storage device 11 is immediately exhausted, to the operator's chagrin, even when heavy load work is started and the heavy load condition is continued. Thus this embodiment can continue to work without powering down even if the heavy load condition is continued. When the load condition is "light load," fuel consumption is generally not very low (good). During the light load condition, the electrical storage device 11 may be charged and the load on the engine 1 may be increased so as to reduce the fuel consumption of the engine.

Next, if the load condition determination section 40 determines that the load condition is "intermediate load," the target SOC for the electrical storage device 11 is set to S2 (intermediate level). Under the intermediate load condition, as described above, the time average load tends to fall within the output range of the engine 1, but the engine 1 tends to require assistance in power from the electrical storage device 11 against momentary demands for large power. Such intermediate load operation occupies almost entirely a day's work of the wheel loader. When the best performance in fuel consumption is obtained under the intermediate load condition, the benefit of the hybrid vehicle can be maximized. While working in this manner in intermediate load operation, the vehicle can offer the best performance in fuel consumption. If the SOC of the electrical storage device 11 is relatively away from the intermediate value (i.e., if the SOC is closer to either S1 or S3) as mentioned above, control may be carried out to let the electrical storage device 11 maintain the current SOC without forced charging or discharging.

Further, if the load condition determination section 40 determines that the load condition is "heavy load," power assist from the electrical storage device 11 (motor generator 6) is needed. Thus if the heavy load condition continues for extended periods of time, the electrical storage device 11 tends to be over-discharged and the SOC of the electrical storage device 11, even if it is initially high (e.g., close to S3), is expected to drop to the lower limit (S1) of the range of use. For this reason, after the SOC of the electrical storage device 11 has reached the lower limit S1, this embodiment is arranged to transition to a control state in which that condition is maintained (constant SOC control). As a result of this, the output power of the vehicle is ultimately limited.

With the work vehicle structured as described above, the more there is extra engine output to spare because of lighter loads on the work vehicle, the more actively the electrical storage device 11 is charged. This allows heavy load work to be started while the SOC of the electrical storage device 11 is high. That in turn enables the work vehicle to perform heavy load work for extended periods of time without powering down.

Figure 9:
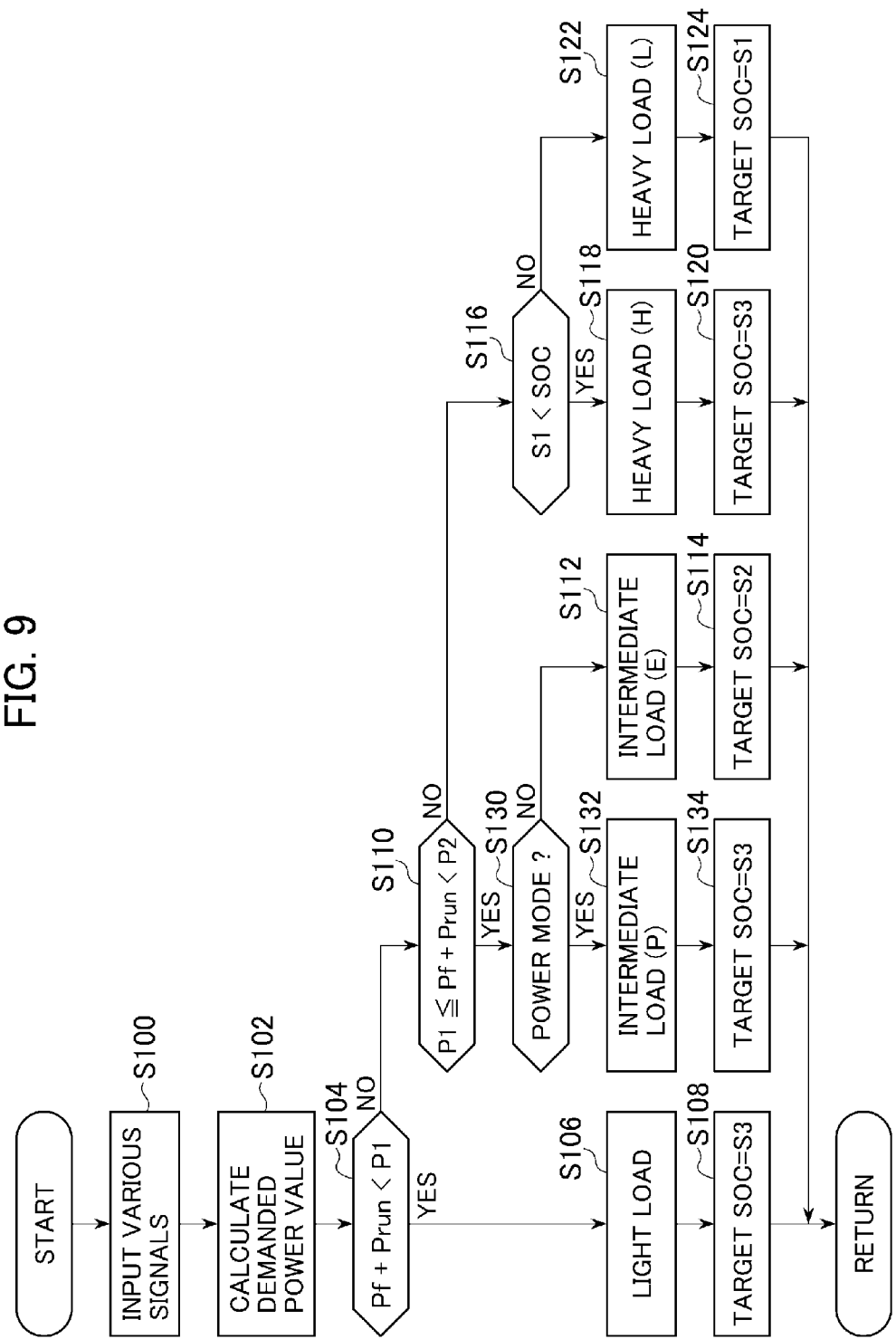
FIG. 9 is a flowchart of another process performed by the load condition determination part and target SOC determination part as part of the embodiment of the invention.

Explained next is another target SOC determination process performed by the load condition determination section 40 and target SOC determination section 41. FIG. 9 is a flowchart of this process carried out by the load condition determination section 40 and target SOC determination section 41. The flowchart in FIG. 9 is different from the flowchart in FIG. 7 in that the "intermediate load" condition is further classified into two categories "intermediate load (P)" and "intermediate load (E)" in accordance with the switching position (selected mode) of the work mode switch 64, with each new category subject to a different target SOC value. Another difference between the two flowcharts is that the "heavy load" condition is further classified into two categories "heavy load (H)" and "heavy load (L)" in accordance with the SOC value of the electrical storage device 11, with each new category also subject to a different target SOC value. In FIG. 9, the same reference characters as in FIG. 7 designate the same or corresponding steps, and their explanations are omitted. The description below will primarily focus on the steps different from those in FIG. 7 (S130, S132, S134, S116, S118, and S120).

If it is determined in S110 that the total demanded power value is smaller than the set value P2, the load condition determination section 40 determines whether the work mode switch 64 is set to P mode on the basis of the work mode signal (S130). If it is verified that the switch 64 is set to P mode, the load condition determination section 40 determines that the load condition is "intermediate load (P)" (S132). (The character (P) added to the load condition indicates that work is in power mode that emphasizes the amount of work.) Given the input of this determination, the target SOC determination section 41 sets the target SOC to the set value S3 (e.g., 70%) (S134). Once the target SOC is set, control is returned to the beginning of the process, and S100 and the subsequent steps are repeated.

Conversely, if it is verified in S130 that the switch 64 is set to E mode, the load condition determination section 40 determines that the load condition is "intermediate load (E)" (S112). The character (E) added to the load condition indicates that work is in economy mode that emphasizes efficiency. Although this notation is different from the notation in S112 of FIG. 7 ("intermediate load" with no additional character), both are the same and the set target SOC (S2) remains the same. That is, in FIG. 9, the character (E) is added solely to make the distinction from the "intermediate load (P)" in S132.

If it is determined in S110 that the total demanded power value is larger than the set value P2, the load condition determination section 40 further determines whether the current SOC value of the electrical storage device 11 is larger than the set value S1 (S116). That is, it is determined in S116 whether the remaining capacity of the electrical storage device 11 is getting exhausted.

If it is determined in S116 that the SOC of the electrical storage device 11 is larger than the set value S1, the load condition determination section 40 determines that the load condition is "heavy load (H)" (S118). (The character (H) added to the load condition indicates that the remaining capacity is larger than the set value S1.) Given the input of this determination, the target SOC determination section 41 sets the target SOC to the set value S3 (S120). Once the target SOC is set, control is returned to the beginning of the process, and S100 and the subsequent steps are repeated.

If it is determined in S116 that the SOC of the electrical storage device 11 is smaller than the set value S1, the load condition determination section 40 determines that the load condition is "heavy load (L)" (S122). Here, the character (L) added to the load condition indicates that the remaining capacity is smaller than the set value S1. Although this notation is different from the notation in S122 of FIG. 7 ("heavy load" with no additional character), both are the same and the set target SOC (S1) remains the same. This allows the SOC of the electrical storage device 11 to be maintained at the lower limit (S1) at which over-discharging can be prevented. Once the target SOC is set to S1, control is returned to the beginning of the process, and S100 and the subsequent steps are repeated.

With the work vehicle structured as described above, when the work mode switch 64 is set to P mode, there is conceivably a high possibility that the operator will demand output of a fairly large magnitude. In that case, even under the intermediate load, the target SOC for the electrical storage device 11 is set to S3 (e.g., upper limit of the range of use of the electrical storage device 11) for control to actively generate power when the engine 1 has extra output to spare so that the amount of charge in the electrical storage device 11 will be raised. On the other hand, if the switch 64 is set to E mode, it is determined that the operator desires energy-saving operation in which fuel consumption is to be minimized. In such a case, the target SOC for the electrical storage device 11 is kept unchanged at S2 so as not to charge actively the electrical storage device 11 (by consuming fuel).

As described, when the target SOC is set in accordance with the switching position of the work mode switch 64, it is possible to avoid powering down as much as possible if the operator places emphasis on the amount of work, and reduce the amount of fuel consumption if the operator gives priority to energy-saving operation. That is, the work vehicle can be operated as desired by the operator.

Furthermore, if the work condition determination section 40 determines that the work condition is "heavy load" and that the SOC of the electrical storage device 11 is larger than S1 (i.e., heavy load (H)), this embodiment sets the target SOC to S3 (high level) so that the electrical storage device 11 may be charged as much as possible even during short periods of time in which there is extra engine output to spare. As a result, the electrical storage device 11 can be charged more actively under heavy workload than in the case of FIG. 7. This makes it possible to slow the reduction in the power level of the electrical storage device 11 as much as possible, so that the continuity of work under heavy load can be improved.

Figure 10:
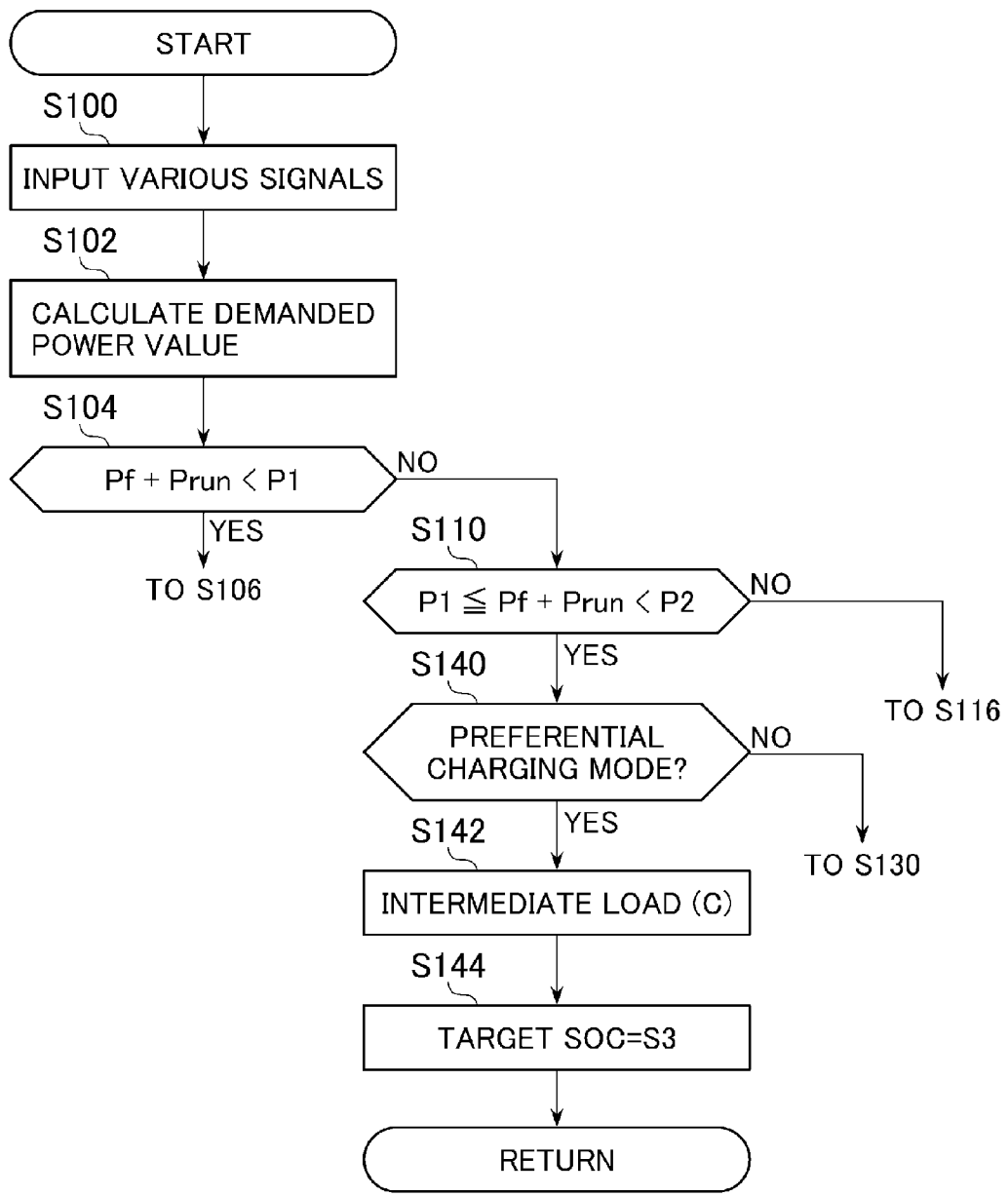
FIG. 10 is a flowchart of yet another process performed by the load condition determination part and target SOC determination part as part of the embodiment of the invention.

Explained next is yet another target SOC determination process performed by the load condition determination section 40 and target SOC determination section 41. FIG. 10 is a flowchart of this process carried out by the load condition determination section 40 and target SOC determination section 41. The flowchart in FIG. 10 is different from the flowchart in FIG. 7 or 9 in that the target SOC value is varied with the switching position (selected mode) of the charging mode switch 65. In FIG. 10, the same reference characters as in FIG. 7 or 9 designate the same or corresponding steps and their explanations are omitted. The description below will primarily focus on the steps different from those in FIG. 7 or 9 (S140, S142, and S144). In FIG. 10, S106, S116, and the steps subsequent to S130 are the same as in the flowchart of FIG. 9 and thus will not be shown.

If it is determined in S110 that the total demanded power value is smaller than the set value P2, the load condition determination section 40 determines whether the charging mode switch 65 is set to preferential charging mode on the basis of the charging mode signal (S140). If it is verified here that the switch 65 is set to preferential charging mode, the load condition determination section 40 determines that the load condition is "intermediate load (C)" (S142). (The character (C) added to the load condition indicates that preferential charging mode is selected.) Given the input of this determination, the target SOC determination section 41 sets the target SOC to the set value P3 (e.g., 70%) (S144). Once the target SOC is set, control is returned to the beginning of the process, and S100 and the subsequent steps are repeated.

Conversely, if it is verified in S140 that the switch 65 is set to normal mode, the steps subsequent to S130 are carried out in accordance with the signal from the work mode switch 64.

With the work vehicle structured as described above, when the charging mode switch 65 is set to preferential charging mode, the operator will demand work under heavy load in the near future. In that case, even where the load condition is determined to be intermediate load as in the case of FIG. 7, the target SOC for the electrical storage device 11 is set to S3 (e.g., upper limit of the range of use of the electrical storage device 11), and power is generated actively whenever the engine 1 provides extra output to spare, so as to increase the amount of charge in the electrical storage device 11. On the other hand, if the charging mode switch 65 is set to normal mode, the target SOC for the electrical storage device 11 is set to S3 or S2 in accordance with the work mode selected by the work mode switch 64.

Where the target SOC is set in keeping with the switching position of the charging mode switch 65 as explained above, the electrical storage device 11 is charged preferentially regardless of the load condition of the work vehicle as long as preferential charging mode is selected. This makes it possible actively to increase the remaining capacity of the electrical storage device 11, which ensures the continuity of heavy work scheduled to be carried out subsequently. That is, the work vehicle can be operated as desired by the operator.

In the example in FIG. 10, the flow in which both the work mode switch 64 and the charging mode switch 65 are installed is explained. This process can also be applied to a work vehicle equipped with the charging mode switch 65 alone. In this case, if it is verified in S140 that normal mode is being selected, S112 and the subsequent steps in FIG. 7 need only be carried.

In the foregoing paragraphs, it is explained that the load condition is determined primarily on the basis of the magnitude of the total required power (Pf+Prun) and that the target SOC is set accordingly. However, the wheel loader often repeats operations of a predetermined pattern, and the load during each operation in such a pattern tends to manifest a distinct difference. For this reason, it is easy to associate the operation with the load condition. That is, with the wheel loader, the target SOC may be set on the basis of the operation.

For example, the most representative work pattern is called V-cycle excavating work. The V-cycle excavating work is the major operation pattern that takes up more than 70 percent of the entire work actually done by the wheel loader. During the operation, the wheel loader first advances toward the target to be excavated such as a gravel mound, and loads the bucket with a haul (e.g., gravel) by thrusting the bucket into the excavation target (e.g., gravel mound). Then the wheel loader backs off to return to the initial position and, with the steering wheel suitably turned and with the lift arm and bucket elevated, advances toward a transport vehicle such as a dump truck. The wheel loader drops the haul into the transport vehicle by tipping the bucket, and backs off again to return to the initial position. The vehicle repeats the work by tracing a V-shaped locus as explained above. When this V-cycle excavating work is evaluated as average load on the vehicle, the work as the average load falls within the range of output of the engine 1 but corresponds to the "intermediate load" operation because power assist from the electrical storage device 11 is required from time to time.

There are several other operation patterns of the wheel loader in addition to the above-described V-cycle excavating work. These patterns include "traveling operation" in which the wheel loader travels from one site to another; "idle state" in which the wheel loader remains in wait state without performing work; and "upward shoveling operation" in which the wheel loader climbs the slope of, say, a mud mount while repeating excavation and soil dropping along the way.

The relations between each of the above-mentioned operations and the load conditions of the work vehicle are as follows: for example, in the traveling operation and in the idle state, the magnitude of the load involved is small relative to engine output, so that these operations may be classified as "light load" operations. The V-cycle excavating work may be classified as an "intermediate load" operation as discussed above. Further, the upward shoveling operation requires climbing the slope while excavating along the way, so that the average load exceeds engine output, with power assist needed continuously from the electrical storage device 11. In that sense, the upward shoveling operation may be classified as a "heavy load" operation.

Therefore, the same benefits as those of the above-described embodiment can also be obtained when the operation of the work vehicle is determined and its load condition is classified accordingly, in keeping with the (amounts of) operations exerted by the operator on the control lever 56, accelerator pedal, and brake pedal, the classification being used as the basis for controlling the target SOC.

The hybrid system targeted by the present invention is not limited to the series type hybrid system in FIG. 1. The invention can also be applied to various other system configurations including the parallel traveling part type.

It is to be noted that the present invention is not limited to the aforementioned embodiments, but covers various modifications. While, for illustrative purposes, those embodiments have been described specifically, the present invention is not necessarily limited to the specific forms disclosed. Thus, partial replacement is possible between the components of a certain embodiment and the components of another. Likewise, certain components can be added to or removed from the embodiments disclosed.

The structures and functions of the above-mentioned control devices 20, 21, 22, 23, 24 and 25 and the processes performed thereby may be implemented partially or entirely by hardware (e.g., the logic for executing each function may be designed as an integrated circuit). Also, the structures of these control devices may be implemented in the form of programs (software) that are retrieved and executed by an arithmetic processing unit (e.g., CPU) to bring about their respective functions. The information about these programs may be stored in semiconductor memories (e.g., flash memories and SSDs), magnetic storage devices (e.g., hard disk drives), and storage media (e.g., magnetic disks and optical disks).

Further note that the control lines and information lines shown above represent only those lines necessary to illustrate the present invention, not necessarily representing all the lines required in terms of products. Thus, it can be assumed that almost all the components are in fact interconnected.

DESCRIPTION OF REFERENCE CHARACTERS

1: Engine
2: Torque converter
3: Transmission (T/M)
4: Hydraulic pump
6: Motor generator (M/G)
7: Inverter
8: Propeller shaft
9: Electric traction motor
10: Inverter
11: Electrical storage device
12: DC-DC converter
20: Hybrid control device
21: Engine control device
22: Converter control device
23: Hydraulic control device
24: Inverter control device
25: Electrical storage control device
30: System control section
31: Power distribution section
32: Engine control section
33: M/G control section
34: Hydraulic control section
35: Traveling control section
40: Load condition determination section
41: Target SOC determination section
50: Work device
60: Track structure
61: Wheels
200: Control device
Pf: Demanded hydraulic power value
Prun: Demanded traveling power value
Pe: Upper limit of engine output
Pc: Upper limit of electrical storage device output

The invention claimed is:
1. A work vehicle comprising:
an engine;
an accelerator pedal for controlling a speed of the engine;
a motor generator driven by the engine;
a hydraulic pump driven by at least either of the motor generator and the engine;
a work device driven by hydraulic fluid from the hydraulic pump;
an operating device for outputting operation signals for driving the work device in accordance with an operation amount;
an electric traction motor for driving a plurality of wheels;
a brake pedal for controlling a braking force for the wheels;
an electrical storage device connected to the motor generator and to the electric traction motor and charged electrically on a basis of a target value of a state of charge (SOC) of the electrical storage device as a target SOC; and
a control device configured to vary the target SOC for the electrical storage device on a basis of a total demanded power value that totals a first power value demanded by the hydraulic pump and a second power value demanded by the electric traction motor, and to control a current SOC of the electrical storage device to approach the target SOC, wherein the control device is further configured to:

calculate the first power value from input values including the operation amount of the operating device, and calculate the second power value from input values including a speed of the work vehicle and a stepping amount of the accelerator or brake pedal, thereby calculating the total demanded power value, determine a load condition of the work vehicle to be a light load when the total demanded power value is lower than a first setting value P1, determine the load condition of the work vehicle to be an intermediate load when the total demanded power value is lower than a second setting value P2 and higher than the first setting value P1, and determine the load condition of the work vehicle to be a heavy load when the total demanded power value is higher than or equal to the second setting value P2, set the target SOC to be higher when the load condition of the work vehicle is determined to be the light load than when the load condition of the work vehicle is determined to be the intermediate load, calculate a power generation command for the motor generator for use in charging the electrical storage device on the basis of a deviation between the current SOC of the electrical storage device and the target SOC, and control the motor generator based on the power generation command, thereby controlling the current SOC of the electrical storage device to approach the target SOC.

2. The work vehicle according to claim 1,

Wherein, when the load condition of the work vehicle is determined to be the heavy load, the control device sets the target SOC to be lower than when the load condition of the work vehicle is determined to be the intermediate load.

3. The work vehicle according to claim 1, wherein, when the load condition of the work vehicle is determined to be the intermediate load, the control device either sets the target SOC to be lower than when the load condition of the work vehicle is determined to be the light load or the heavy load, or sets the current SOC of the electrical storage device to the target SOC.

4. The work vehicle according to claim 1, wherein, when the load condition of the work vehicle is determined to be the heavy load and when the current SOC of the electrical storage device is higher than a lower limit of a range of use of the electrical storage device, the control device sets the target SOC to be higher than when the load condition of the work vehicle is determined to be the intermediate load.

5. The work vehicle according to claim 1, wherein, when the load condition of the work vehicle is determined to be the light load, the control device sets the target SOC to an upper limit of a range of use of the electrical storage device.

6. The work vehicle according to claim 1, further comprising:

a first switching device switching a threshold limit value of the total output of the hydraulic pump and of the electric traction motor either to a first value or to a second value higher than the first value;

wherein, when the load condition of the work vehicle is determined to be the intermediate load and when the threshold limit value is switched to the first value by the first switching device, the control device either sets the target SOC to be lower than when the load condition of the work vehicle is determined to be the light load or the heavy load, or sets the current SOC of the electrical storage device to the target SOC, and wherein, when the load condition of the work vehicle is determined to be the intermediate load and when the threshold limit value is switched to the second value by the first switching device, the control device sets the target SOC to be higher than when threshold limit value is switched to the first value.

7. The work vehicle according to claim 1, further comprising:

a second switching device having a first position and a second position, the first position being selected to give preference to charging the electrical storage device, and the second position being selected not to give preference to the charging, wherein, when the load condition of the work vehicle is determined to be the intermediate load and when the second switching device is set to the first position, the control device either sets the target SOC to be lower than when the load condition of the work vehicle is determined to be the light load or the heavy load, or sets the current SOC of the electrical storage device to the target SOC, and wherein, when the load condition of the work vehicle is determined to be the intermediate load and when the second switching device is set to the second position, the control device sets the target SOC to be higher than when the second switching device is set to the first position.

* * * * *